UNITED STATES PATENT OFFICE 2,447,504

FLUORODINITROETHANES

Henry B. Hass, West Lafayette, Ind., and Arthur Charles Whitaker, Oakmont, Pa., assignors to Purdue Research Foundation, West Lafayette, Ind., a corporation of Indiana No Drawing. Application December 7, 1945,
Serial No. 633,540

4 Claims. (Cl. 260—644)

This invention is concerned with a novel group of aliphatic fluoronitro compounds, and more specifically concerned with the fluorodinitroethanes.

We have prepared certain members of this group of compounds and have determined certain of their physical characteristics whereby they may be identified. The desirability of these compounds arises from toxic and lachrymatory qualities, which make them especially adaptable to insecticidal purposes, and from their utility as intermediates. The compounds are generally colorless liquids or solids boiling near the boiling point of water and possessing additional volatility compared with similar chlorine compounds.

The compounds may be prepared by vapor phase treatment of a fluorochloroethylene or tetrafluoroethylene with nitrogen tetroxide at slightly elevated temperatures. The dissociation product of nitrogen tetroxide, $NO_2$, which is a highly reactive radical assumed to contain an unpaired electron, adds to the double bond, yielding the desired fluorodinitro compound.

The following examples illustrate a method by which these compounds may be prepared, but are in no way to be construed as limiting the invention thereto:

Example 1

1,2-dichloro-1,2-difluoro-1,2-dinitroethane was prepared in the following manner: 1,2-dichloro-1,2-difluoroethylene and nitrogen tetroxide were released from storage cylinders, passed through flow-meters and drying tubes, mixed and introduced into the upper end of a spiral Pyrex reactor. The reactor was eighteen feet in length, sixteen millimeters in diameter and contained a packing of Pyrex helices, as the extent of the reaction depends upon surface area. The reactor was immersed in a bath maintained at about 52 degrees centigrade. Crude products were collected in an electrically heated flask attached to the lower end of the reactor. From this flask the unreacted gases passed into a helix-packed, 18-millimeter Pyrex column, thirty inches in height. A water condenser surmounting the vertical column minimized the amount of product carried away by unreacted gases. Vapors, after leaving the condenser, passed through an aqueous solution of sodium hydroxide, which served as a scrubber for nitrogen tetroxide. Finally, unreacted olefin was condensed by means of a dry ice bath. A ratio of nitrogen tetroxide to olefin of 0.8 to 1.0 was employed and produced a crude product yield of 80 per cent. This organic product was dissolved in absolute alcohol. Aqueous sodium hydroxide was added dropwise until the disappearance of blue-colored impurities, probably containing ester linkages which were selectively hydrolyzed by the alkali. Two colorless layers formed on dilution with water. The lower layer was washed and dried over calcium chloride. Rectification yielded 1,2-dichloro-1,2-difluoro-1,2-dinitroethane, a colorless distillate boiling at 55-56 degrees centigrate at 35 millimeters of mercury pressure absolute. 1,2-dichloro-1,2-difluoro-1,2-dinitroethane melted between 12 and 18 degrees centigrade and had a specific gravity of 1.646 at 20 degrees centigrade and a refractive index of 1.4116 at 25 degrees centigrade.

Analysis of dl- and meso-1,2-dichloro-1,2-difluoro-1,2-dinitroethane:

|  | Percent F | Percent Cl | Molecular Refraction |
|---|---|---|---|
| Theory | 16.9 | 31.5 | 33.55 |
| Found | 16.8 | 30.5 | 34.01 |

Example 2 dl-1-chloro-1,2,2-trifluoro-1,2-dinitroethane was prepared in the same manner as the above, using 1-chloro-1,2,2-trifluoroethane and nitrogen tetroxide as starting materials. dl-1-chloro-1,2,2-trifluoro-1,2-dinitroethane boils at 98 to 99 degrees centigrade at 750 millimeters of mercury pressure absolute. The compound has a specific gravity of 1.674 at 20 degrees centigrade and a refractive index of 1.3748 at 25 degrees centigrade.

Analysis of dl-1-chloro-1,2,2-trifluoro-1,2-dinitroethane:

|  | Percent F | Percent Cl | Molecular Refraction |
|---|---|---|---|
| Theory | 27.3 | 17.0 | 28.81 |
| Found | 25.7 | 17.8 | 28.50 |

Example 3

A nickel autoclave was utilized in the preparation of tetrafluoro-1,2-dinitroethane. The autoclave, equipped with pressure gauge and bleeder valve, was cooled in an ice bath. Fifty milliliters of carbon tetrachloride and ninety grams of nitrogen tetroxide were placed in the autoclave and the head and bleeder valve closed. The autoclave was then cooled in liquid air. Six moles of tetrafluoroethylene was allowed to pass into the autoclave through the bleeder valve. The valve was then closed and the autoclave brought to room temperature. The autoclave was opened after forty-eight hours, during which period the pressure, as shown on the attached gauge, had declined to zero. The contents were poured over cracked ice and purified by the method used in Example 1. Rectification yielded 1,1,2,2-tetrafluoro-1,2-dinitroethane, boiling at 57–58 degrees centigrade at 750 millimeters of mercury pressure absolute. The compound melts at −41.5 degrees centigrade and has a specific gravity of 1.595 at 20 degrees centigrade and a refractive index of 1.348 at 25 degrees centigrade. Molecular refraction was found to be 25.76 compared to the theoretical value of 24.38.

We claim:
1. 1,2-dichloro-1,2-difluoro-1,2-dinitroethane.
2. 1-chloro-1,2,2-trifluoro-1,2-dinitroethane.
3. Tetrafluoro-1,2-dinitroethane.
4. A tetrahalo-1,2-dinitroethane, containing from 2 to 4 fluorine atoms, inclusive, the remaining halogen atoms, if any, being chlorine atoms.

HENRY B. HASS.
ARTHUR CHARLES WHITAKER.

REFERENCES CITED

The following references are of record in the file of this patent:

UNITED STATES PATENTS

| Number | Name | Date |
|---|---|---|
| 1,707,727 | Kampa et al. | Apr. 2, 1929 |

OTHER REFERENCES

Burrows et al., "Jour. Chem. Soc." (1932), pages 1357–1360.

Argo et al., "J. Phys. Chem.," vol. 23. (1919), pages 578–585.

Certificate of Correction

Patent No. 2,447,504.     August 24, 1948.

HENRY B. HASS ET AL.

It is hereby certified that errors appear in the printed specification of the above numbered patent requiring correction as follows: Column 2, line 9, for "centigrate" read *centigrade*; line 27, for "trifluoroethane" read *trifluoroethene*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*